(12) United States Patent
Pitte et al.

(10) Patent No.: US 9,719,882 B2
(45) Date of Patent: Aug. 1, 2017

(54) OPTICAL DEVICE, OPTICAL TEST BENCH AND OPTICAL TEST METHOD

(71) Applicants: Emmanuelle Pitte, Fontenay Aux Roses (FR); Vincent Petit, Paris (FR); Pierre Lecoq, Chaville (FR)

(72) Inventors: Emmanuelle Pitte, Fontenay Aux Roses (FR); Vincent Petit, Paris (FR); Pierre Lecoq, Chaville (FR)

(73) Assignee: CASSIDIAN TEST & SERVICES, Elancourt (FR)

( * ) Notice: Subject to any disclaimer, the term of this patent is extended or adjusted under 35 U.S.C. 154(b) by 287 days.

(21) Appl. No.: 14/371,588

(22) PCT Filed: Jan. 7, 2013

(86) PCT No.: PCT/FR2013/050025
§ 371 (c)(1),
(2) Date: Jul. 10, 2014

(87) PCT Pub. No.: WO2013/104851
PCT Pub. Date: Jul. 18, 2013

(65) Prior Publication Data
US 2014/0347653 A1    Nov. 27, 2014

(30) Foreign Application Priority Data
Jan. 13, 2012 (FR) ...................................... 12 50333

(51) Int. Cl.
*G01B 9/00* (2006.01)
*G01M 11/04* (2006.01)
(Continued)

(52) U.S. Cl.
CPC ............. *G01M 11/04* (2013.01); *F21V 13/02* (2013.01); *F21V 14/06* (2013.01); *G01J 1/0411* (2013.01);
(Continued)

(58) Field of Classification Search
CPC ....... F21V 14/06; G01J 1/0411; G01J 1/0448; G01J 1/08; G01J 1/4257; G02B 15/161
(Continued)

(56) References Cited

U.S. PATENT DOCUMENTS

| | | |
|---|---|---|
| 5,564,811 A | 10/1996 | Lim |
| 2004/0145819 A1* | 7/2004 | Wang ....................... G02B 9/60 359/763 |

(Continued)

FOREIGN PATENT DOCUMENTS

| | | |
|---|---|---|
| CN | 101 226 344 B | 6/2010 |
| FR | 2 936 065 A1 | 3/2010 |

(Continued)

OTHER PUBLICATIONS

International Search Report, dated May 2, 2013, from corresponding PCT application.

*Primary Examiner* — Tri T Ton
(74) *Attorney, Agent, or Firm* — Young & Thompson

(57) ABSTRACT

This optical system includes: a device (106) for generating a plane light wave, called a collimated light wave ($OL_{col}$); and a device (114) for deviating the collimated light wave so as to provide a light wave, called a test light wave ($OL_{test}$), the deviating device (114) having an adjustable focal length.

15 Claims, 2 Drawing Sheets

(51) Int. Cl.
*G02B 15/16* (2006.01)
*G02B 27/30* (2006.01)
*G01J 1/42* (2006.01)
*G01J 1/04* (2006.01)
*G01J 1/08* (2006.01)
*F21V 13/02* (2006.01)
*F21V 14/06* (2006.01)

(52) U.S. Cl.
CPC ............... *G01J 1/0448* (2013.01); *G01J 1/08* (2013.01); *G01J 1/4257* (2013.01); *G02B 15/161* (2013.01); *G02B 27/30* (2013.01)

(58) Field of Classification Search
USPC .............. 356/124–127, 154, 141.3, 124–127
See application file for complete search history.

(56) References Cited

U.S. PATENT DOCUMENTS

2004/0263783 A1    12/2004   Neal et al.
2005/0128468 A1     6/2005   Murata

FOREIGN PATENT DOCUMENTS

JP        2005 091930 A    4/2005
JP        2010 211842 A    9/2010

* cited by examiner

OPTICAL DEVICE, OPTICAL TEST BENCH AND OPTICAL TEST METHOD

BACKGROUND OF THE INVENTION

The present invention relates to an optical device, an optical test bench and an optical test method.

In order to test an optical or optoelectronic observation system, hereinafter referred to as a unit to be tested, it is known to use an optical test bench comprising an optical device designed to form a test light wave with variable resolving power, i.e., which may be convergent, divergent or collimated.

The known optical device comprises a light source providing a light wave, called source light wave, a screen receiving the source light wave and concealing part thereof in order to provide a light wave, called test light wave, and a convergent optical lens (or equivalent), designed to receive the test light wave and having a focus on the side of the light source and the screen.

In particular, the lens may be replaced by a concave mirror.

In this known optical device, the light source and the screen can move together relative to the lens so as to place the screen behind the focus, at the focus or even in front of the focus of the lens or the concave mirror, such that the optical device respectively provides a divergent, collimated or convergent light wave.

The test light wave is designed to be received by the unit to be tested, which thus sees the test chart formed by the screen as if that test chart were situated at a distance comprised between a value below five kilometers and infinity (distance greater than five kilometers), depending on the resolving power of the test light wave.

The unit to be tested is then designed to focus on the test chart and to provide an image of that test chart to a computer device. The latter can perform different tests on the image so as in particular to assess the quality of focusing done by the unit to be tested.

The preceding known optical device has the problem that it is difficult to resituate the test chart precisely at the focus of the lens or the concave mirror. This replacement requires many manipulations and verifications of the position of the test chart. Furthermore, the mechanical system making it possible to place the test chart relative to the lens or concave mirror is complex and expensive.

However, such a replacement is necessary. For example, in order to determine the mechanical reference axis of the unit to be tested, it is known to perform an auto-collimation using a mirror reflecting the collimated test wave. However, if the screen is not precisely at the focus of the lens or the concave mirror, the reflected wave can no longer be observed by a video or optical viewing system.

SUMMARY OF THE INVENTION

To that end, proposed is an optical system comprising:
a device for generating a planar light wave, called collimated light wave, and
a device for deviating the collimated light wave in order to provide a light wave, called test light wave, the deviating device having an adjustable focal length.

Optionally, the focal length of the deviating device is adjustable, in particular in terms of distance to infinity.

Optionally, the focal length is adjustable in an interval extending from infinity to a predetermined value.

Optionally, the predetermined value is negative.

Optionally, the predetermined value is positive.

Optionally, the deviating device comprises:
a first optical lens designed to receive the collimated light wave and to deviate it to provide a light wave, called intermediate light wave;
a second optical lens designed to receive the intermediate light wave and deviate it to provide the test light wave;
a separating device bearing the two optical lenses and intended to make it possible to adjust a separation between the two optical lenses on which the focal length of the deviating device depends; and in which the two optical lenses (202, 204) have opposite focal lengths.

Optionally, the first optical lens is divergent and the second optical lens is convergent.

Optionally, the absolute value of the ratio of the focal lengths of the two optical lenses is different from one.

Optionally, the two optical lenses are made from the same material.

Optionally, the absolute value of the ratio of the focal length of the first lens to the focal length of the second lens is comprised between 0.992 and 0.995.

Optionally, the device for generating the collimated light wave comprises: —a light source emitting a source light wave; —a partially transparent screen having a certain pattern, the screen being positioned through the source light wave so as to conceal part thereof and to allow another part thereof to pass, called test chart light wave; —a collimator arranged to receive the test chart light wave and collimate it to provide the collimated light wave.

Further proposed is an optical test bench comprising: —an optical system according to the invention; —an optical or optoelectronic observation system, called unit to be tested, designed to receive the test light wave and to provide an image from the test light wave; —a computer device designed to perform one or more processing operations on the image.

Further proposed is a method for testing an optical or optoelectronic observation system, called unit to be tested, comprising: —adjusting a focal length of a deviating device, —providing a planar light wave, called collimated light wave, to the deviating device; —the deviation, by the deviating device, of the collimated light wave to provide a light wave, called test light wave; —providing the test light wave to the unit to be tested, these steps being carried out several times, each time adjusting the focal length of the deviating device to a different value.

Optionally, the deviation of the collimated light wave comprises: —providing the collimated light wave to a first optical lens designed to deviate it to provide a light wave, called intermediate light wave; —providing the intermediate light wave to a second optical lens designed to deviate it to provide the test light wave; and in which the adjustment of the focal length of the deviating device comprises: —adjusting a separation between the two optical lenses on which the focal distance of the deviating device depends.

BRIEF DESCRIPTION OF THE DRAWINGS

Example embodiments of the invention will now be described in reference to the following figures:

FIG. 3 is a simplified view of the deviating device of FIG. 2 on which a test light wave provided by the deviating device is shown, for a first adjustment of the deviating device, FIG. 4 is similar to FIG. 3, for a second adjustment of the deviating device, and FIG. 5 is a block diagram of an optical test method according to the invention implemented by the optical test bench of FIG. 1.

DESCRIPTION OF PREFERRED EMBODIMENTS

Figure 1:
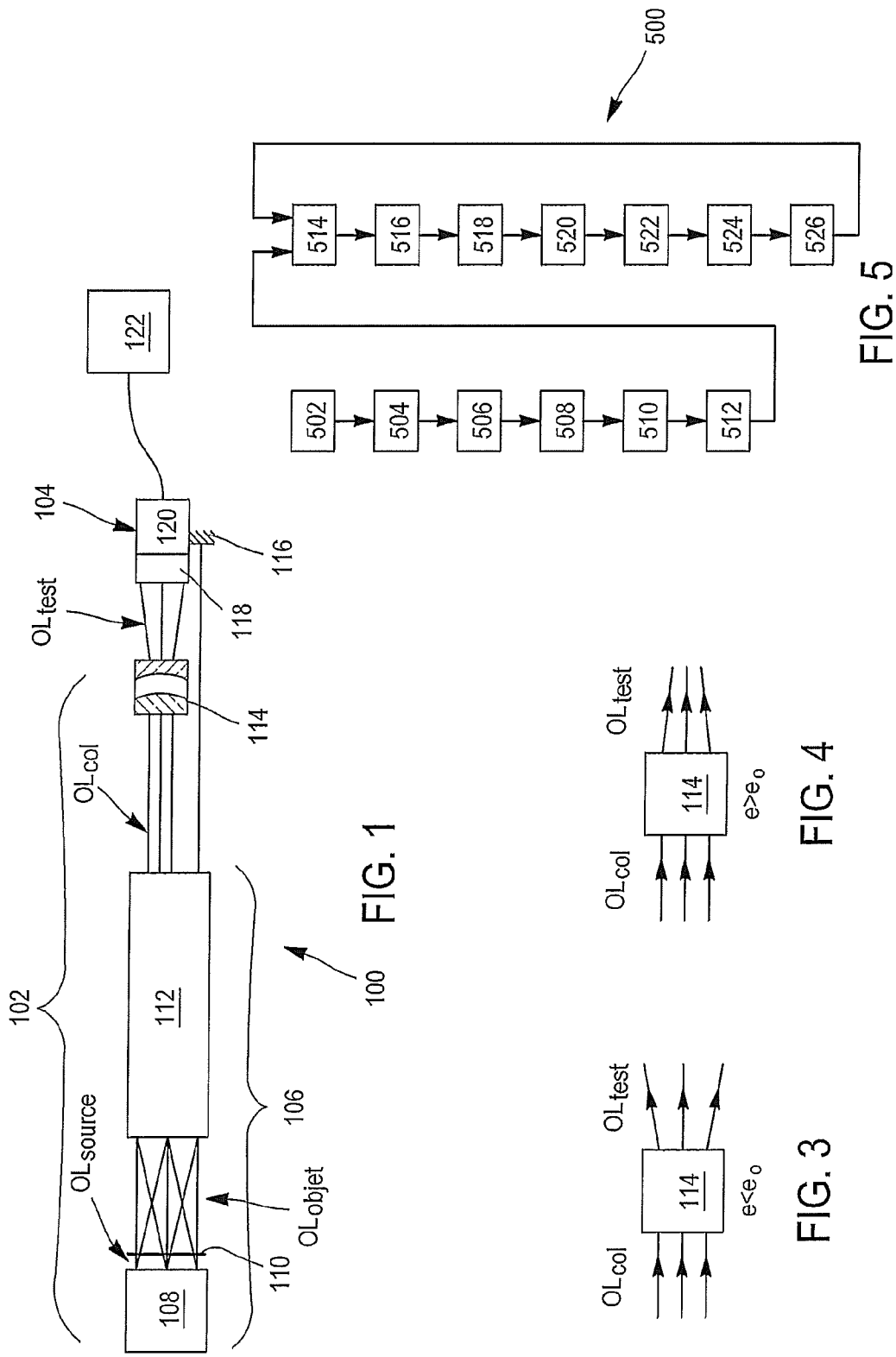
FIG. 1 is a simplified view of an optical test bench according to the invention.

In reference to FIG. 1, an optical test bench 100 according to the invention comprises an optical system 102 designed to provide a test light wave $OL_{test}$ and an optical or optoelectronic observation system, called unit to be tested 104, designed to receive the test light wave $OL_{test}$.

The optical system 102 first comprises a device 106 for generating a planar light wave, called collimated light wave and denoted $OL_{col}$.

The generating device 106 first comprises a light source 108 emitting a light wave with a non-zero resolving power, called source light wave and denoted $OL_{source}$. The light source 108 is for example a laser or an array of light-emitting diodes.

The generating device 106 further comprises a partially transparent screen 110 having a certain pattern. The screen 110 is positioned through the source light wave $OL_{source}$ so as to conceal part thereof and to allow another part thereof to pass, called test chart light wave and denoted $OL_{mire}$. The screen 110 forms a test chart that the unit to be tested 104 is designed to target, i.e., to focus. The screen will therefore be referred to hereinafter as "test chart".

The generating device 106 further comprises a collimator 112 arranged to receive the test chart light wave $OL_{mire}$ and to collimate it so as to provide the collimated light wave $OL_{col}$.

The optical system 102 further comprises a device 114 for deviating the collimated light wave $OL_{col}$ to provide the test light wave $OL_{test}$. As will be explained hereinafter, the deviating device 114 has a variable focal length, denoted F.

Preferably, the unit to be tested 104 is at least one meter away from the deviating system 114.

The optical system 102 further comprises a mirror 116 arranged on the side of the observation system to be tested 104 so as to receive part of the collimated light wave $OL_{col}$, but without screening the observation system to be tested 104. The mirror 116 is oriented perpendicular to the collimated light wave $OL_{col}$ so as to reflect it in its arrival direction, toward the collimator 112. The mirror 116 is fastened to the observation system to be tested 104 so that it can be used to determine the mechanical reference axis of the unit to be tested 104 by auto-collimation, as previously explained.

The unit to be tested 104 first comprises a focusing device 118 designed to receive the test light wave $OL_{test}$.

The unit to be tested 104 further comprises an image recording cell 120, on which the focusing device 118 is designed to focus the test light wave $OL_{test}$ in order to form an image of the test chart 110 thereon. The image recording cell 120 is designed to record that image.

The optical system 102 further comprises a computer device 122 connected to the image recording cell in order to receive the image recorded by the latter. The computer device 122 is designed to perform different tests on that image, in particular to assess the degree of fuzziness of the image. This assessment makes it possible to assess the correctness of the focusing done by the focusing device 118 of the unit to be tested 104.

Figure 2:
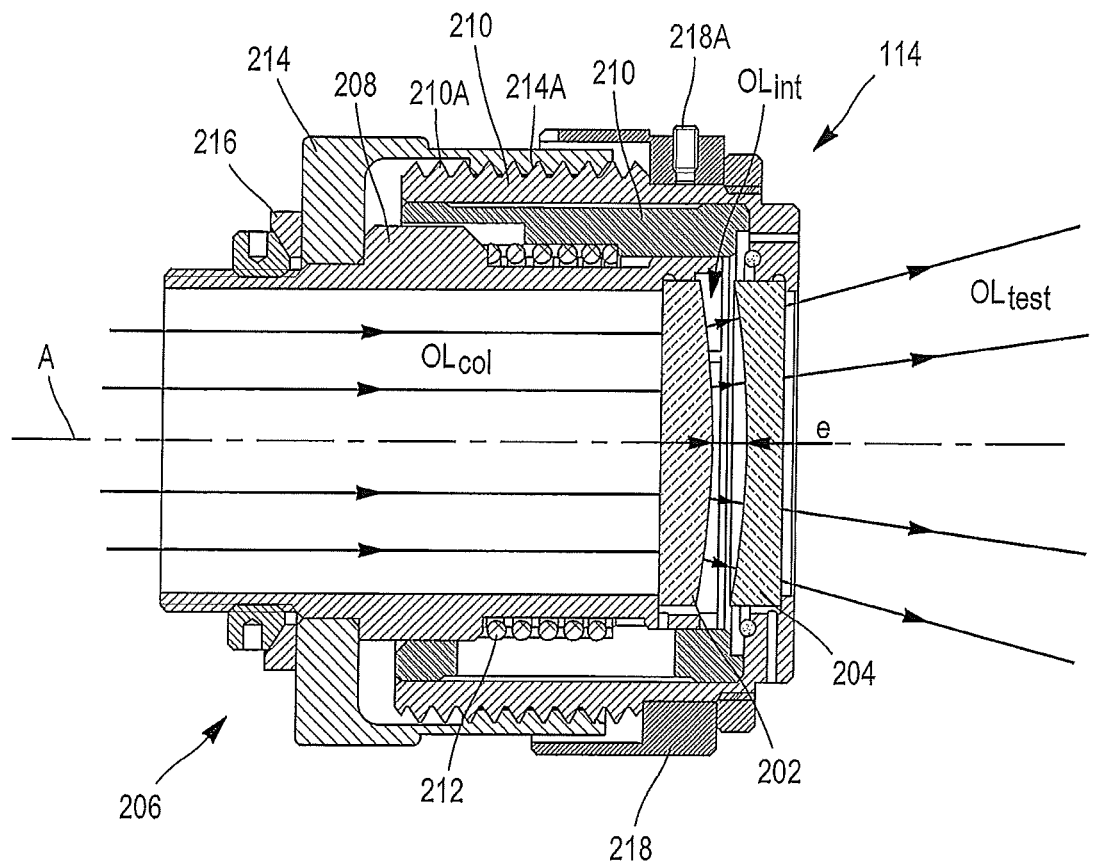
FIG. 2 is a cross-sectional view of a deviating device of the optical test bench of FIG. 1.

In reference to FIG. 2, the deviating device 114 first comprises a first optical lens 114 designed to receive the collimated light wave $OL_{col}$ and deviate it in a light wave, called intermediate light wave $OL_{int}$.

The deviating device 110 further comprises a second optical lens 204 designed to receive the intermediate light wave $OL_{int}$ and to deviate it in the test light wave $OL_{test}$.

The two optical lenses 202, 204 are aligned along their main optical axis (along which axis a light ray is not deviated), denoted A.

In the rest of the description, the positioning adjectives such as front, back, inner, outer, etc. will refer to the main optical axis A, oriented in the arrival direction of the test chart light wave $OL_{mire}$.

The two optical lenses 202, 204 have opposite focal lengths, denoted F1 and F2, respectively. In the described example, the first optical lens 114 is divergent (negative focal length F1), while the second optical lens 118 is convergent (positive focal length F2). More specifically, in the described example, the first lens 204 is a planar-convex lens (in the passage direction of the light), while the second lens 206 is a concave-planar lens (in the passage direction of the light).

Furthermore, in the described example, the two optical lenses are made from the same material, for example glass. Preferably, they are provided with an anti-reflective treatment. Indeed, the deviating device 114 comprises four air/glass interfaces. However, with no anti-reflective treatment, parasitic images that may be visible to the unit to be tested 104 would be created at each interface. The unit to be tested 104 would therefore be disrupted.

The deviating device 114 further comprises a separating device 206 bearing the two optical lenses 202, 204 and designed to make it possible to adjust a separation e between the two optical lenses 202, 204. The focal length F of the deviating device 110 depends on this separation e, such that by varying that separation e, it is possible to adjust the focal length F.

In the described example, the separating device 206 first comprises an inner sleeve 208 to which the first optical lens 202 is fastened.

The separating device 206 further comprises an outer sleeve 210 fitted on the inner sleeve 208 and to which the second optical lens 204 is fastened. The outer sleeve 210 is provided with an outer threading 210A. The inner sleeve 208 is designed to slide along the main optical axis A in the outer sleeve 210, in order to separate the first optical lens 202 or bring it closer with respect to the second optical lens 204 along the main optical axis A.

The separating device 206 further comprises a spring 212 compressed along the main optical axis A between the two sleeves 208, 210 and designed to make up the play between the parts.

The separating device 206 further comprises an adjusting ring 214 mounted on the inner sleeve 208 so as to be able to rotate on the inner sleeve 208 around the main optical axis A. The adjusting ring 214 forwardly abuts against the inner sleeve 208. The adjusting ring 214 comprises an inner threading 214A meshed with the outer threading 210A of the outer sleeve 210. The adjusting ring 214 is further provided with a reference (not visible in the figure) on its outer surface.

The separating device 206 further comprises a maintaining ring 216 mounted on the inner sleeve 208 abutting behind the adjusting ring 214, such that the latter is gripped between the maintaining ring 216 and the inner sleeve 208 in order to be locked in translation along the main optical axis A relative to the inner sleeve 208.

Thus, the rotation of the adjusting ring 214 drives, through the meshing of the threads 210A and 214A and owing to its translational locking, the movement of the inner sleeve 208 along the main optical axis A, and thus the adjustment of the separation e between the first and second optical lenses 202, 204.

The separating device 206 further comprises an identification ring 218 mounted on the outer sleeve 210 so as to be able to be rotated on that outer sleeve 210 around the main optical axis A. A screw 218A is provided to fasten the identification ring 218 relative to the outer sleeve 210 in a desired position. The identification ring 218 is provided with graduations on its outer surface that are designed to be related to the reference of the adjusting ring 214, so as to be able to position the adjusting ring 214 relative to the identification ring 218.

Preferably, the absolute value of the ratio of the focal lengths F1, F2 of the two optical lenses 202, 204 is different from one. In the described example, the absolute value of the ratio of the focal distance F1 to the focal distance F2 is 0.994. In general, the absolute value of the ratio of the focal length F1 to the focal length F2 is preferably comprised between 0.992 and 0.995. Thus, it is possible to obtain a focal length F of the deviating device 114 of zero (i.e., the deviating device 114 then does not deviate the collimated light wave $OL_{col}$, such that the test light wave $OL_{test}$ is identical to the collimated light wave $OL_{col}$, and therefore planar) for a non-zero value of the separation e, called neutral separation $e_0$. Thus, when the separation e is smaller than the neutral separation $e_0$, the focal length F of the deviating device 114 is negative and the deviating device 114 is divergent (FIG. 3), whereas when the separation e is greater than the neutral separation $e_0$, the focal length F of the deviating device 114 is positive and the deviating device 114 is convergent (FIG. 4).

Furthermore, with such a ratio of the focal lengths F1 and F2, the geometric and chromatic errors are relatively negligible.

Preferably, the separation e can be adjusted so as to vary the focal length F from −50 meters to +50 meters, passing through infinity, i.e., over the two intervals: [−∞; −50 meters] and [+50 meters;+∞].

Preferably, the threads 210A, 214A are such that at most, a single revolution of the identification ring 210 makes it possible to cover both desired intervals.

A method 500 according to the invention for testing the optical or optoelectronic observation system 104 will now be described in reference to FIG. 5.

During step 502, the light source 108 generates the source light wave $OL_{source}$.

During step 504, the source light wave $OL_{source}$ passes through the test chart 110 to provide the test chart light wave $OL_{mire}$.

During step 506, the collimator 112 receives the test chart light wave $OL_{mire}$ and collimates the latter to provide the collimated light wave $OL_{col}$.

During step 508, the deviating device 114 receives the collimated light wave $OL_{col}$ and deviates it according to its focal length F to provide the test light wave $OL_{test}$.

During step 510, the adjusting ring 214 is rotated so as to use the mirror 116 to adjust the focal length F of the deviating device 114 to infinity.

During step 512, the identification ring 218 is rotated so as to place one of the graduations across from the reference of the adjusting ring 214 and to fasten the identification ring 218 using the screw 218A. This graduation, called neutral graduation, therefore indicates the neutral position of the adjusting ring, in which the test light wave is collimated. Preferably, the other graduations are graduated in dioptres so as to indicate the dioptres of the corresponding deviating device 114 at the angle of the adjusting ring 214 relative to its neutral position.

During step 514, the adjusting ring 214 is rotated so as to use the reference and the graduations to adjust the focal length F of the deviating device 114 to a desired value.

During step 516, the light source 108 generates the source light wave $OL_{source}$.

During step 518, the source light wave $OL_{source}$ passes through the test chart 110 to provide the test chart light wave $OL_{mire}$.

During step 520, the collimator 112 receives the test chart light wave $OL_{mire}$ and collimates the latter to provide the collimated light wave $OL_{col}$.

During step 522, the deviating device 114 receives the collimated light wave $OL_{col}$ and deviates it according to its focal length F to provide the test light wave $OL_{test}$.

During step 524, the focusing device 118 of the unit to be tested 104 receives the test light wave $OL_{test}$ and focuses the latter on the recording cell 120.

During step 526, the recording cell 120 forms an image from the light wave focused by the focusing device 118 and sends that image to the computer device 122.

During step 528, the device 122 receives the image formed by the recording cell 120 and performs one or more processing operations of that image in order to deduce an index thereof characterizing the quality of the focusing done by the focusing device.

Steps 514 to 528 are carried out several times successively by adjusting the separation e to a different value each time (and therefore by adjusting the focal length F of the deviating device 114 to a different value each time). The values to which the separation e is successively adjusted preferably comprise at least: a value below $e_0$ (negative focal length F), the value $e_0$ (infinite focal length F), and a value greater than $e_0$ (positive focal length F).

The invention is not limited to the example embodiment previously described, but on the contrary is defined by the following claims.

One skilled in the art will in fact see that various changes can be made to this example embodiment, in light of the teachings disclosed above.

In particular, the invention may be applied to the visible domain, as is the case in the example previously described, or the infrared domain.

Furthermore, in the following claims, the terms used must not be interpreted as limiting the claims to the elements of the example embodiment previously described, but must be interpreted to comprise all equivalents that may be anticipated within the reach of one skilled in the art by applying his general knowledge.

The invention claimed is:

1. An optical system comprising:
   a generating device (106) for generating a planar collimated light wave ($OL_{col}$); and
   a deviating device (114) for deviating the collimated light wave to provide a test light wave ($OL_{test}$) the deviating device (114) having an adjustable focal length, wherein the generating device (106) comprises,
  a light source (108) emitting a source light wave ($OL_{source}$),
  a partially transparent screen (110) having a certain pattern, the screen (110) being positioned through the source light wave ($OL_{source}$) so as to conceal part thereof and to allow another part thereof to pass, called a test chart light wave ($OL_{mire}$), and
  a collimator (112) arranged to receive and collimate the test chart light wave ($OL_{mire}$) to provide the collimated light wave ($OL_{col}$).

2. The optical system according to claim 1, wherein the focal length of the deviating device (114) is adjustable in terms of distance to infinity.

3. The optical system according to claim 2, wherein the focal length is adjustable in an interval extending from infinity to a predetermined value.

4. The optical system according to claim 3, wherein the predetermined value is negative.

5. The optical system according to claim 3, wherein the predetermined value is positive.

6. The optical system according to claim 1, wherein the deviating device comprises:
  a first optical lens (202) designed to receive and deviate the collimated light wave ($OL_{col}$) to provide a light wave, called intermediate light wave ($OL_{int}$),
  a second optical lens (204) designed to receive and deviate the intermediate light wave ($OL_{int}$) to provide the test light wave ($OL_{test}$), and
  a separating device (206) bearing the first and second optical lenses (202, 204) and arranged to adjust a separation (e) between the first and second optical lenses (202, 204) on which the focal length of the deviating device (114) depends,
  wherein the first and second optical lenses (202, 204) have opposite focal lengths.

7. The optical system according to claim 6, wherein the first optical lens (202) is divergent and the second optical lens (204) is convergent.

8. The optical system according to claim 6, wherein an absolute value of a ratio of the focal lengths of the first and second optical lenses (202, 204) is different from one.

9. The optical system according to claim 6, wherein the first and second optical lenses are made from a same material.

10. The optical system according to claim 8, wherein the absolute value of the ratio of the focal length of the first lens (202) to the focal length of the second lens (204) is between 0.992 and 0.995.

11. An optical test bench, comprising:
  the optical system (102) according to claim 1,
  an optical or optoelectronic observation system, called unit to be tested (104), designed to receive the test light wave ($OL_{test}$) and to provide an image from the test light wave ($OL_{test}$), and
  a computer device designed to perform one or more processing operations on the image.

12. A method for testing an optical or optoelectronic system, called unit to be tested (104), the method comprising:
  adjusting (514) a focal distance of a deviating device (114);
  providing (520) a planar collimated light wave ($OL_{col}$), to the deviating device (114), wherein the providing step comprises,
    emitting a source light wave ($OL_{source}$) from a light source (108),
    positioning a partially transparent screen (110) having a certain pattern through the source light wave ($OL_{source}$) so as to conceal part thereof and to allow another part thereof to pass, called a test chart light wave ($OL_{mire}$), and
    receiving and collimating the test chart light wave ($OL_{mire}$) to provide the collimated light wave ($OL_{col}$);
  deviating (522) the collimated light wave ($OL_{col}$) using the deviating device (114) in order to provide a light wave, called test light wave ($OL_{test}$), and
  providing (522) the test light wave ($OL_{test}$) to the unit to be tested (104),
  these steps being carried out several times, adjusting the focal length of the deviating device (114) to a different value each time.

13. The test method according to claim 12, wherein the deviation (522) of the collimated light wave ($OL_{col}$) comprises:
  providing the collimated light wave to a first optical lens (202) designed to deviate the collimated light wave to provide a light wave, called intermediate light wave ($OL_{int}$),
  providing the intermediate light wave ($OL_{int}$) to a second optical lens (204) designed to deviate the intermediate light wave to provide the test light wave ($OL_{test}$), and
  wherein the adjusting of the focal length of the deviating device (114) comprises:
  adjusting a separation (e) between the first and second optical lenses (202, 204) on which the focal length of the deviating device (114) depends.

14. The optical system according to claim 9, wherein the absolute value of the ratio of the focal lengths of the first and second optical lenses (202, 204) is different from one, and the absolute value of the ratio of the focal length of the first lens (202) to the focal length of the second lens (204) is comprised between 0.992 and 0.995.

15. The optical system according to claim 7, wherein the absolute value of the ratio of the focal lengths of the first and second optical lenses (202, 204) is different from one.

* * * * *